(12) United States Patent
Bayramian et al.

(10) Patent No.: US 8,780,440 B2
(45) Date of Patent: Jul. 15, 2014

(54) DISPERSION COMPENSATION IN CHIRPED PULSE AMPLIFICATION SYSTEMS

(75) Inventors: Andrew James Bayramian, Manteca, CA (US); William A. Molander, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 535 days.

(21) Appl. No.: 12/782,566

(22) Filed: May 18, 2010

(65) Prior Publication Data

US 2011/0026105 A1 Feb. 3, 2011

Related U.S. Application Data

(60) Provisional application No. 61/230,793, filed on Aug. 3, 2009.

(51) Int. Cl.
*H01S 4/00* (2006.01)
*H01S 3/10* (2006.01)

(52) U.S. Cl.
USPC .......................... 359/347; 359/337.5; 372/25

(58) Field of Classification Search
USPC .................................. 359/337.5, 347; 372/25
See application file for complete search history.

(56) References Cited

U.S. PATENT DOCUMENTS

| | | | |
|---|---|---|---|
| 3,748,015 A | 7/1973 | Offner | |
| 4,928,316 A * | 5/1990 | Heritage et al. | 398/199 |
| 5,349,591 A * | 9/1994 | Weston et al. | 372/25 |
| 5,696,782 A * | 12/1997 | Harter et al. | 372/25 |
| 5,960,016 A * | 9/1999 | Perry et al. | 372/25 |
| 6,746,310 B2 | 6/2004 | Tricard et al. | |
| 6,819,438 B2 | 11/2004 | Neily et al. | |
| 6,922,599 B2 | 7/2005 | Richey | |
| 2002/0081943 A1 | 6/2002 | Hendron et al. | |
| 2007/0014317 A1 * | 1/2007 | Liu et al. | 372/6 |
| 2008/0043789 A1 * | 2/2008 | Moro et al. | 372/25 |

OTHER PUBLICATIONS

International Search Report and Written Opinion of PCT Application No. PCT/US2010/044138, mailed Oct. 1, 2010, 8 pages total.
Bagnoud et al., Laboratory for Laser Energetics, "High-Energy, High-Average-Power Laser Using Nd:YLF Rods Corrected by Magnetorheological Finishing," LLE Review 99, Apr.-Jun. 2004, 9 pages total. Retrieved from the Internet: <http://www.lle.rochester.edu/pub/review/V99/99High04-C.pdf>.

(Continued)

*Primary Examiner* — Eric Bolda
(74) *Attorney, Agent, or Firm* — Kilpatrick Townsend & Stockton LLP

(57) ABSTRACT

A chirped pulse amplification system includes a laser source providing an input laser pulse along an optical path. The input laser pulse is characterized by a first temporal duration. The system also includes a multi-pass pulse stretcher disposed along the optical path. The multi-pass pulse stretcher includes a first set of mirrors operable to receive input light in a first plane and output light in a second plane parallel to the first plane and a first diffraction grating. The pulse stretcher also includes a second set of mirrors operable to receive light diffracted from the first diffraction grating and a second diffraction grating. The pulse stretcher further includes a reflective element operable to reflect light diffracted from the second diffraction grating. The system further includes an amplifier, a pulse compressor, and a passive dispersion compensator disposed along the optical path.

11 Claims, 7 Drawing Sheets

(56) References Cited

OTHER PUBLICATIONS

Bagnoud et al., "High-Energy, High-Average-Power Laser Using Nd:YLF Rods Corrected by Magnetorheological Finishing," Jan. 10, 2005; Applied Optics, 44(2): 282-288.

Menapace et al., "Combined Advanced Finishing and UV-Laser Conditioning for. Producing UV-Damage-Resistant Fused Silica Optics," Proc. SPIE, Laser-Induced Damage in Optical Materials, Nov. 2001; 4679: 56-68. Retrieved from the Internet: <http://www.zygo.com/library/papers/proc_4679_56.pdf>.

Menapace et al., "Magnetorheological Finishing for Imprinting Continuous Phase Plate Structure onto Optical Surfaces" in Boulder Damage Symposium XXXV, Boulder, CO (US), Sep. 21-24, 2003, 13 pages total.

Menapace et al., "MRF applications : Measurement of process-dependent subsurface damage in optical materials using the MRF wedge technique," in Boulder Damage Symposium, Boulder, CO (US), Sep. 19-21, 2005, 11 pages total.

Menapace et al., "MRF Applications: On the Road to Making Large-Aperture Ultraviolet Laser Resistant Continuous Phase Plates for High-Power Lasers," in Boulder Damage Symposium, Boulder, CO (US), Sep. 25-27, 2006, 13 pages total.

Menapace et al., "Utilization of Magnetorheological Finishing as a Diagnostic Tool for Investigating the Three•Dimensional Structure of Fractures in Fused Silica," in Boulder Damage Symposium XXXII, Boulder, CO (US), Sep. 19-21, 2005, 14 pages total.

Molander, "A Large-Bandwidth, Cylindrical Offner Pulse Stretcher for a High-Average-Power, 15 Femtosecond Laser", in Advanced Solid-State Photonics Conference, Denver, Colorado, Feb. 1-4, 2009, 3 pages total.

Schaffers et al., "Improved Optical Quality for Ti:Sapphire Using MRF," in Advanced Solid-State Photonics, Nara, Japan, Jan. 27, 2008, 2 pages total.

Wegner et al., "NIF Final Optics System: Frequency Conversion and Beam Conditioning," Optical Engineering at the Lawrence Livermore National Laboratory II: The National Ignition Facility. Edited by Lane, Monya A.; Wuest, Craig R. Proceedings of the SPIE, 2004; 5341:180-189. Retrieved from the Internet: <https://lasers.lllnl.gov/programs/pdfs/final_optics_system.pdf>.

Weiner, "Femtosecond Pulse Shaping Using Spatial Light Modulators," Rev. Sci. Instrum., May 2000; 71(5):1929-1960.

U.S. Appl. No. 12/760,418, filed Apr. 14, 2010; first named inventor: Joseph Arthur Menapace.

* cited by examiner

DISPERSION COMPENSATION IN CHIRPED PULSE AMPLIFICATION SYSTEMS

CROSS-REFERENCES TO RELATED APPLICATIONS

This application claims priority to U.S. Provisional Patent Application No. 61/230,793, filed on Aug. 3, 2009, entitled "Improved optical quality for titanium doped sapphire and sapphire through magnetorheological finishing," the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Chirped pulse amplification (CPA) systems are used to amplify ultra-short laser pulses to high power levels. In the CPA system, an input laser pulse is stretched out in time, amplified, and then compresses after amplification. The former Nova laser at the Lawrence Livermore National Laboratory was an example of a laser utilizing chirped pulse amplification and operating at the petawatt level. In addition to research lasers, some commercial Ti:sapphire lasers utilize CPA to generate peak powers greater than a gigawatt.

CPA laser systems utilize the temporal and spreading of the input pulse prior to amplification to reduce the damage that can occur in gain medium through nonlinear processes such as self-focusing as optical power increases in the amplifier section. Typically, the stretcher operates so that the low-frequency components of the laser pulse travel a shorter path than the high-frequency components. After passing through the stretcher, the laser pulse becomes positively chirped (i.e., the high-frequency components lag behind the low-frequency components). Utilizing a stretcher, it is possible to increase the duration of the input pulse by one or more orders of magnitude. The stretched pulse, with a lower intensity, is then amplified using one or more amplification stages. After amplification, the amplified laser pulse is temporally compressed using a compressor, preferably back to the original pulse width.

The presence of optical material in a chirped pulse amplification laser system causes dispersion in the chirped pulse, which must be compensated somewhere else in the system before the pulse can be compressed to a minimum pulse length. Several techniques exist which have been used for dispersion compensation including: the use of an acousto-optic programmable dispersive filter (AOPDF) and a spatial light modulator (SLM). The AOPDF is programmable and adaptive, however this option is costly and has to be actively controlled for the laser system to operate properly. The SLM, for example, a liquid crystal SLM, is also programmable and adaptive, however this option suffers from discreet "pixels" of adjustable phase delay as well as difficulty during calibration.

SUMMARY OF THE INVENTION

According to the present invention, techniques related to optical systems are provided. More particularly, embodiments of the present invention relate to methods and systems for compensating for dispersion in chirped pulse amplification systems. Merely by way of example, the invention is applied to fabrication of a dispersion compensator utilizing a magnetorheological finishing (MRF) process. The dispersion compensator is integrated into the optical system of the chirped pulse amplification system, for example, as a component of the stretcher or compressor to provide a varying path length as a function of wavelength. The methods and systems described herein are also applicable to other optical systems that benefit from dispersion compensation.

According to an embodiment of the present invention, a chirped pulse amplification system is provided. The chirped pulse amplification system includes a laser source providing an input laser pulse along an optical path. The input laser pulse is characterized by a first temporal duration. The chirped pulse amplification system also includes a multi-pass pulse stretcher disposed along the optical path. The multi-pass pulse stretcher includes a first set of mirrors operable to receive input light in a first plane and output light in a second plane parallel to the first plane and a first diffraction grating operable to receive light from one or more of the first set of mirrors. The multi-pass pulse stretcher also includes a second set of mirrors operable to receive light diffracted from the first diffraction grating and a second diffraction grating operable to receive light from the second set of mirrors. The multi-pass pulse stretcher further includes a reflective element operable to reflect light diffracted from the second diffraction grating. The chirped pulse amplification system further includes an amplifier disposed along the optical path, a pulse compressor disposed along the optical path, and a passive dispersion compensator disposed along the optical path.

According to another embodiment of the present invention, a method of fabricating a dispersion compensator is provided. The method includes a) determining a residual group delay associated with a chirped pulse amplification system having a pulse stretcher, an amplification stage, a pulse compressor; and a dummy phase plate and b) determining a surface profile for the dispersion compensator as a function of the residual group delay. The method also includes c) determining an updated residual group delay associated with the chirped pulse amplification system having the pulse stretcher, the amplification stage, the pulse compressor, and the dispersion compensator and d) determining if the updated residual group delay is greater than a predetermined threshold. The method further includes e) if the updated residual group delay is greater than the predetermined threshold: determining an updated surface profile for the dispersion compensator as a function of the updated residual group delay and repeating steps c) and d). Moreover, the method includes f) forming the updated surface profile on the dispersion compensator using a magnetorheological finishing process.

Numerous benefits are achieved by way of the present invention over conventional techniques. For example, the present technique provides a method to compensate for spectral dispersion using passive techniques that do not require active control. Moreover, embodiments of the present invention utilize no moving parts, improving system performance and lifetime. Additionally, no power is utilized to operate the dispersion correction element in embodiments of the present invention. The dispersion compensator described herein is easily removed from the optical system and can be adjusted rapidly if changes are made in the optical system. Furthermore, embodiments of the present invention provide a low cost solution to the problem of compensating for dispersion in CPA systems, utilizing only a glass plate that has been finished using an MRF polishing step. Depending upon the embodiment, one or more of these benefits may be achieved. These and other benefits will be described in more detail throughout the present specification and more particularly below.

These and other objects and features of the present invention and the manner of obtaining them will become apparent to those skilled in the art, and the invention itself will be best understood by reference to the following detailed description read in conjunction with the accompanying drawings.

DETAILED DESCRIPTION OF SPECIFIC EMBODIMENTS

Figure 1:
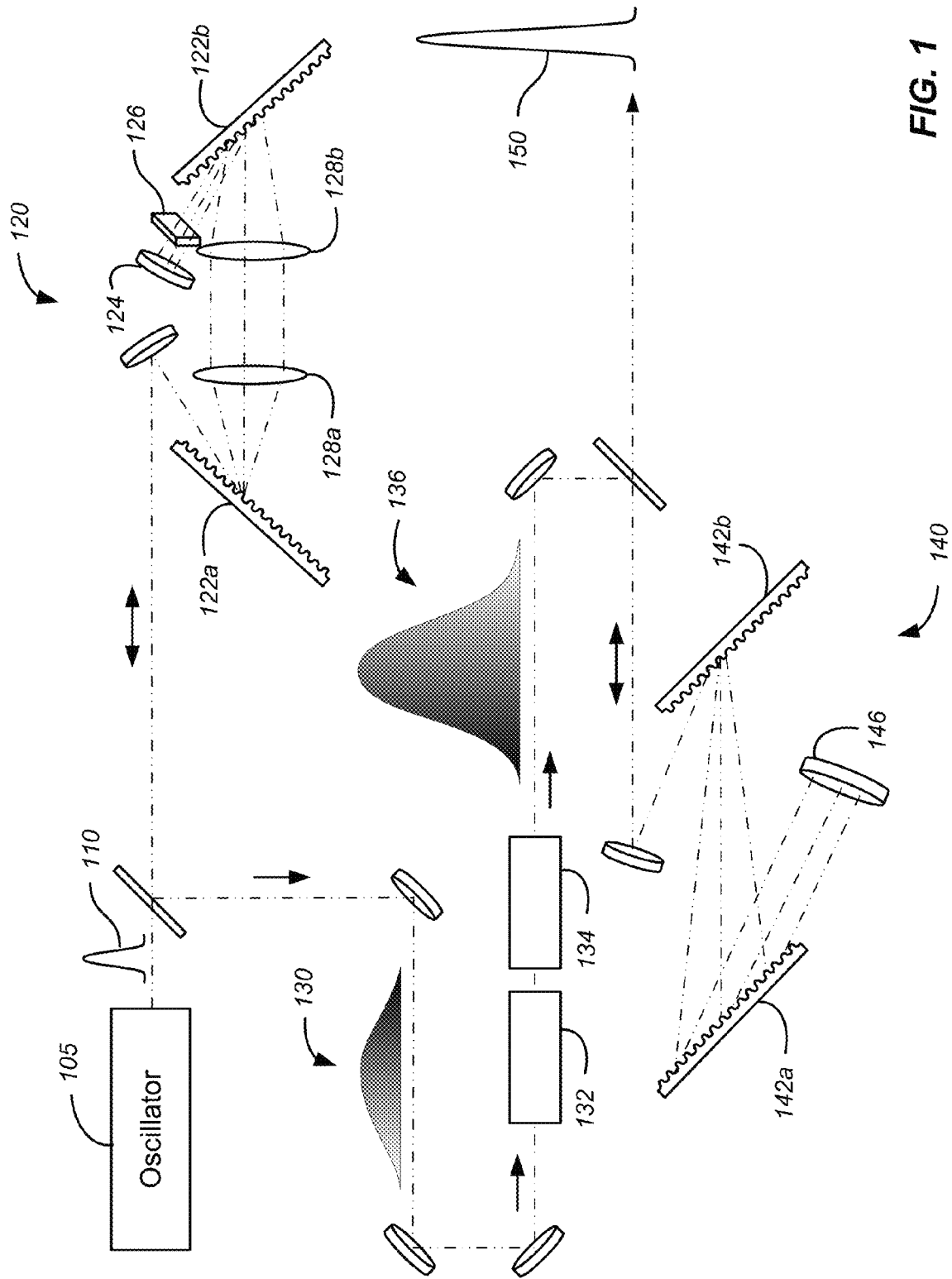
FIG. 1 is a simplified schematic diagram of a chirped pulse amplifier laser system according to an embodiment of the present invention.

According to embodiments of the present invention, short pulse generation by chirped pulse amplification utilizes compensation of the dispersion induced by optical materials in the system to achieve a minimum temporal pulse. It will be appreciated that the optical materials present in the system add higher order dispersive terms that are difficult or impossible to compensate with simple angle or distance adjustments to the pulse stretcher or compressor gratings. As discussed above, several techniques have been developed to compensate for these dispersive terms including the use of an acousto-optic programmable dispersive filter and spatial light modulators. Despite the benefits provided by these active dispersion compensation approaches, there is a need in the art for passive methods of providing dispersion compensation in chirped pulse amplifiers.

Embodiments of the present invention utilize magnetorheological finishing (MRF) systems to form predetermined spatial profiles on dispersion correction optics. MRF systems are suitable for use in deterministic polishing of optics. Utilizing an MRF system, it is possible to fabricate a dispersion compensator that can be inserted into the optical path of a chirped pulse amplifier. According to embodiments of the present invention, a thin dispersion compensator (similar in geometry to a phase plate) is utilized as an optical element in a chirped pulse amplification system to reduce the residual group delay as a function of wavelength to a level less than a predetermined threshold. The residual group delay may also be referred to as the residual phase delay and includes contributions from all included coatings and dispersive materials. In an embodiment, the dispersion compensator is integrated into the stretcher at a location at which the various wavelengths are spatially dispersed, for example, adjacent to the retroreflector. An MRF system is used to form the dispersion compensator with a predetermined spatial profile that varies as a function of position. Thus, the different wavelengths of light pass through different thicknesses of material as they pass through the dispersion compensator, thereby reducing the total system dispersion. As a result, embodiments of the present invention provide reductions in the residual group delay and the length of the temporal pulse as a consequence. In comparison with other techniques, embodiments of the present invention have no moving parts, require no power to operate, do not impact system alignment, and is removable and/or adjustable if needed in response to changes in the optical system. Thus, some embodiments of the present invention provide a low cost solution utilizing only a glass plate and an MRF polishing step.

The presence of optical material in a chirped pulse amplification laser system causes dispersion in the chirped pulse, which must be compensated for in some other portion of the system if the pulse is to be compressed to a minimum pulse length. As previously described, several techniques have been utilized to provide dispersion compensation. Embodiments of the present invention overcome the limitations and expense of conventional techniques.

Magnetorheological finishing (MRF) is a deterministic surface finishing technique based on a sub-aperture polishing tool. MRF has been applied to the polishing and finishing of optical elements. The technique uses a magnetorheological (MR) fluid with a viscosity that is a function of the magnetic field applied to the MR fluid. As an example, iron carbonyl is used in some MR fluids and has a viscosity that can be increased by up to a factor of ~1000 by application of a magnetic field.

The MR fluid is delivered by a fluid pump to a rotating spherical wheel as a ribbon adjacent to the moving optical element. An electromagnet generates a field at the face of the optical element that causes the MR fluid to stiffen, thus becoming a sub-aperture polishing tool. The MRF system provides control over the shape and stiffness of the MR fluid used to polish the workpiece. When the stiffened fluid on the rotating wheel moves out of the magnetic field, it reverts to a lower viscosity liquid and is captured by a fluid drain and recycled. Typically, the removal rate of the MRF polishing tool is maintained at a constant level by monitoring system parameters including the flow rate of the MR fluid, the pressure within the delivery system, the temperature of the MR fluid, and the like.

The shear stress at the MR fluid/optical element interface is used to polish the optical element and the stiffened MR fluid can be analyzed in terms of a removal function. The material removal rate is controlled by varying the residence time over the optical surface.

As described more fully below, embodiments of the present invention utilize MRF polishing to fabricate a thin dispersion compensator (i.e., a phase plate with a predetermined varying phase as a function of position) to correct for the dispersion present in a CPA system. In an embodiment, the dispersion compensator is placed in the stretcher of the CPA system at a location where the wavelengths are spatially dispersed. In another embodiment, the dispersion compensator is placed in the compressor of the CPA system at a location where the wavelengths are spatially dispersed.

By selectively removing optical material from locations on the dispersion compensator associated with different frequencies or wavelengths, the light passing through the dispersion compensator will have a total system dispersion that can be minimized, enabling a temporal pulse with a reduced pulse width (preferably a minimum pulse width) to be produced by the CPA system.

FIG. 1 is a simplified schematic diagram of a chirped pulse amplifier laser system according to an embodiment of the present invention. The system receives an initial short pulse 110 from an oscillator 105. In some embodiments, the oscillator is included as part of the system, whereas in other embodiments, the oscillator is separate. The initial short pulse 110 propagates to the pulse stretcher 120, which in the illustrated embodiment, includes to diffraction gratings 122a and 122b, a retroreflector 124 and a dispersion compensator 126 and two lenses 128a and 128b. As described more fully throughout the present specification, the dispersion compensator may also be integrated into a pulse compressor. Additional description related to the dispersion compensator 126 is provided throughout the present specification and more particularly below. The grating pair 122a and 122b disperse and collimate the pulse as it is stretched in time. Although a particular implementation of a pulse stretcher 120 is illustrated in FIG. 1, the present invention is not limited to this particular geometry and other designs of pulse stretchers are included within the scope of the present invention, for example, the multi-pass pulse stretcher 200 illustrated in FIG. 2.

Figure 8:
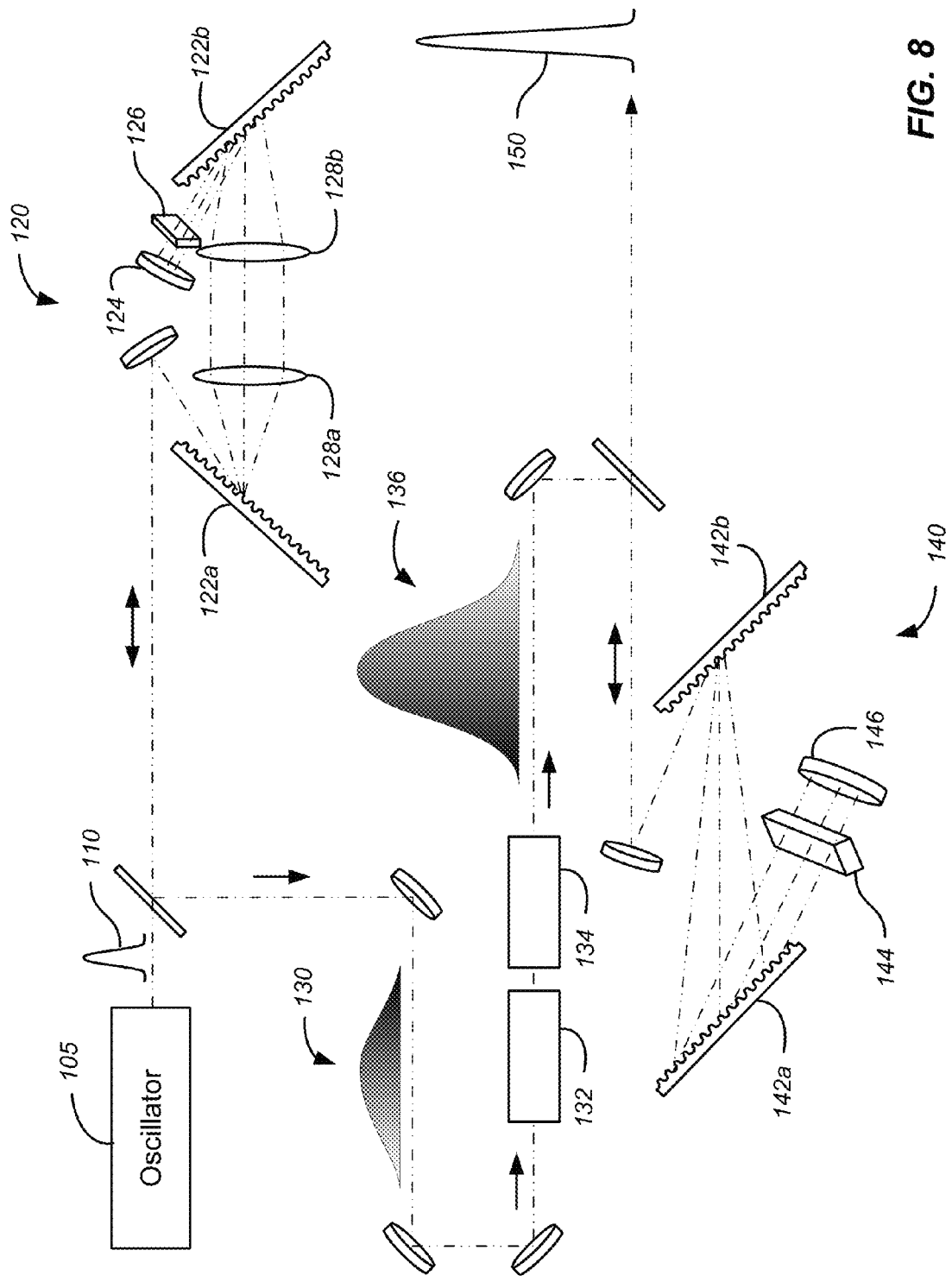
FIG. 8 is a simplified schematic diagram of a chirped pulse amplifier laser system according to another embodiment of the present invention.

After the pulse is stretched in time by the pulse stretcher 120, the amplitude of the pulse is reduced in value as illustrated by stretched pulse 130, enabling safe amplification of the pulse. The stretched pulse is amplified in one or more power amplifiers 132/134 to produce an amplified, high-energy pulse 136. The amplified pulse is then compressed using pulse compressor 140. The illustrated pulse compressor includes two diffraction gratings 142a and 142b, and a retroreflector 146. It should be noted that in some embodiments, of the present invention, either the dispersion compensator 126 integrated into the pulse stretcher or the dispersion compensator 144 integrated into the pulse compressor (illustrated in FIG. 8) is utilized. In other embodiments, as illustrated in FIG. 8, both dispersion compensators 126 and 144 can be utilized. One of ordinary skill in the art would recognize many variations, modifications, and alternatives.

In the pulse compressor 140, a second pair of gratings 142a and 142b are utilized to reverse the dispersion associated with the pulse stretcher and optics in the system in compressing the pulse, ideally back to the original pulse width. A high-energy pulse 150 that is compressed to a minimum width and a maximum power is produced by the chirped pulse amplifier laser system.

Figure 2:
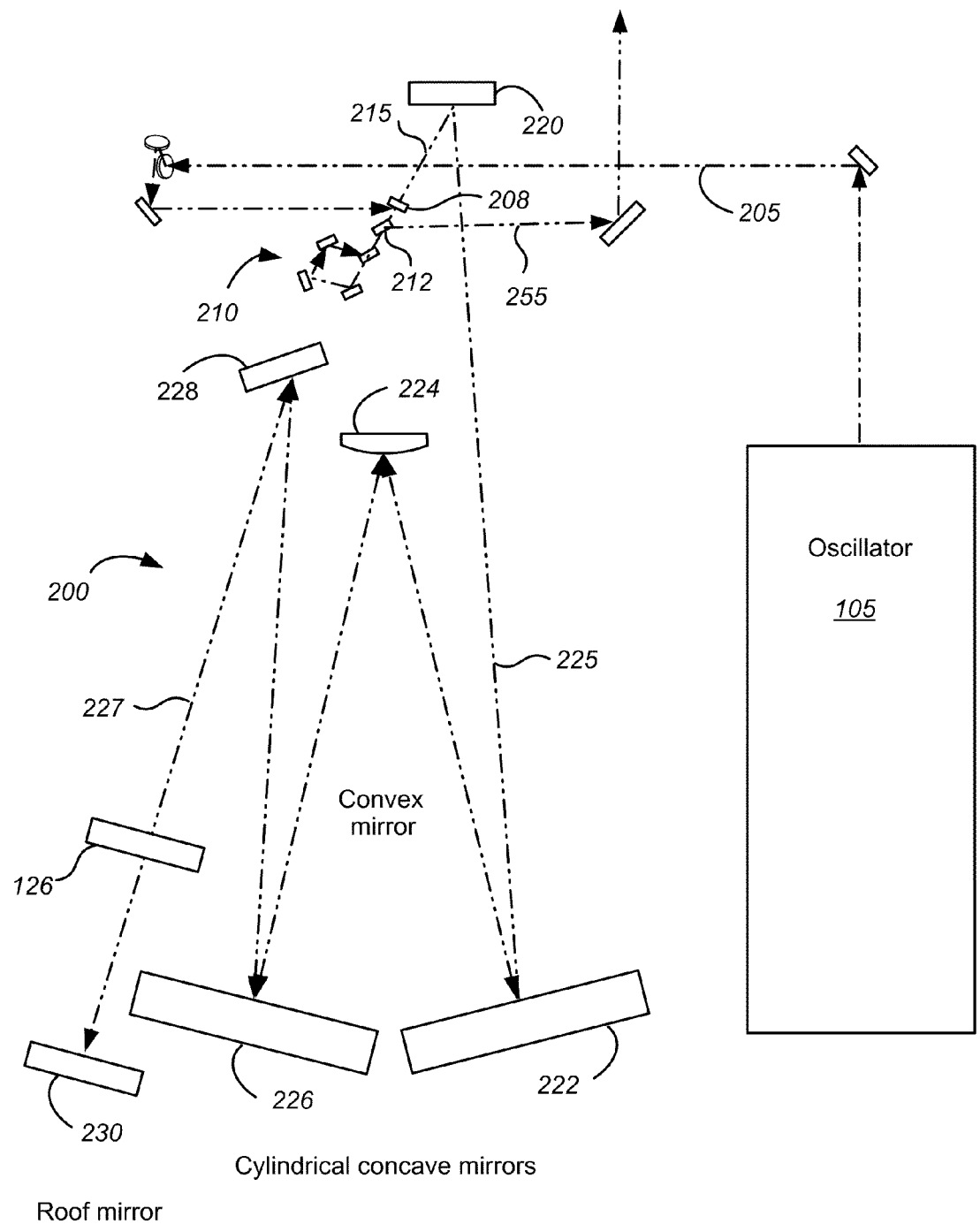
FIG. 2 is a simplified schematic diagram of a multi-pass pulse stretcher incorporating a dispersion compensator according to an embodiment of the present invention.

FIG. 2 is a simplified schematic diagram of a multi-pass pulse stretcher 200 incorporating a dispersion compensator according to an embodiment of the present invention. Referring to FIG. 2, a modified Offner triplet telescope is utilized as a stretcher. As will be evident to one of skill in the art, the Offner triplet is useful as an ultrashort pulse stretcher. In the embodiment illustrated in FIG. 2, a number of unique design features have been added to the traditional triplet. As an example, cylindrical mirrors are utilized as opposed to spherical mirrors, resulting in easier alignment and reductions in dispersive aberrations. In other embodiments, spherical or aspherical mirrors are utilized as appropriate to the particular application.

Figure 5:
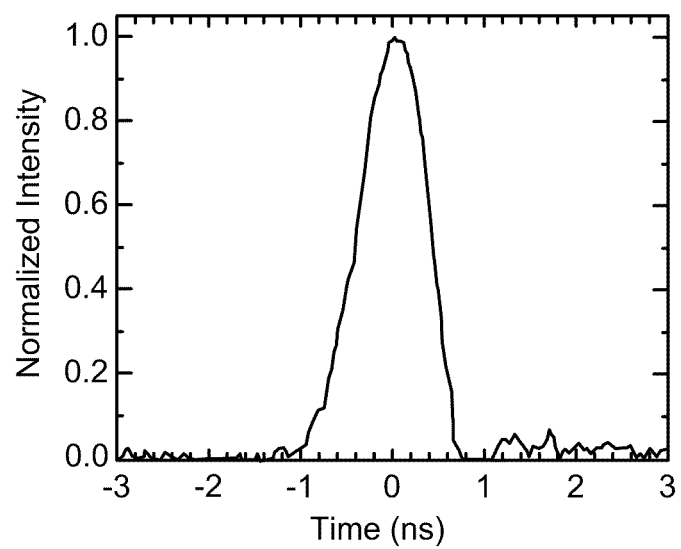
FIG. 5 is a temporal plot of the laser pulse after passing through the stretcher.

According to an embodiment of the present invention, a laser pulse enters the CPA system from a 10 fs input source (e.g., provided by a Femtosource Pro, available from Femtolasers, Inc. of Cambridge, Mass.). As illustrated in FIG. 5, the pulse is stretched to nearly 2 ns after passing through the stretcher four times.

Referring to FIG. 2, a pulse from oscillator 105 is directed along optical path 205 and reflected off of injection mirror 208 to enter staircase 210. The pulse, which is reflected off of injection mirror 208 to enter the staircase passes by mirror 212, which is located at a different height than injection mirror 208. After passing through the staircase, the light emerges at a different height and passes by mirror 208 along optical path 215. A first grating 220 is the first element of the pulse stretcher 200 in the illustrated embodiment. In an embodiment, both the first grating 220 and the second grating 228 (discussed below) are matched gratings having 1357 lines/mm. Light diffracts off of the first grating along optical path 225 and is dispersed as it propagates toward mirror 222, which is the first mirror in a set of two cylindrical concave mirrors (mirror 222 and mirror 226).

Light is reflected from mirror 222 and directed to convex mirror 224, where it is reflected to the second mirror 226 in the set of cylindrical concave mirrors. Next, the light is reflected toward the second grating 228. As the pulse is propagating from the first grating 220 to the second grating 228 as it makes the first pass through the pulse stretcher 200, the light is being dispersed to form a beam at the second grating 228 that is spectrally dispersed and also spreading in time. The second grating 228 collimates the beam, which is directed along optical path 227 toward roof mirror 230. The roof mirror 230, having a V-shape in cross-section, reflects light with the reflected beam located at a different height than the input beam approaching the roof mirror along optical path 227.

Reflected light, at the second height makes a second pass through the pulse stretcher, diffracting off of the second grating 228, mirror 226, convex mirror 224, and mirror 222 toward the first grating 220. Because the beam after the second pass through the pulse stretcher is at a second height, the beam diffracted from the first grating 220 passes by the injection mirror 208 and impinges on other mirrors of the staircase 210. The light moves through the staircase and is reflected back toward the first grating 220 at a third height as it passes by both injection mirror 208 and mirror 212. Thus, the partially stretched pulse is re-injected into the pulse stretcher 200 at the third height. The horizontal inversion introduced by the staircase cancels any resulting spatial chirp generated during the first two passes through the pulse stretcher.

The partially stretched pulse passes through the pulse stretcher again, making a third and fourth pass as it follows the beam path of the first and second passes, but at different heights. Exiting the pulse stretcher at a fourth height, mirror 212 reflects the light toward other optical elements and the power amplifiers (not shown) along optical path 255. By providing an optical path including four passes through the pulse stretcher, the initial 10 fs pulse is stretched to about 2 ns. Other embodiments make two passes through the pulse stretcher, providing less increase in the pulse width. One of ordinary skill in the art would recognize many variations, modifications, and alternatives. In one implementation, all the optics, including the first and second gratings, are gold coated to meet the 200 nm bandwidth associated with the pulse stretcher design.

The first grating 220 is in the plane perpendicular to the system symmetry axis through the common center of curvature of the mirrors, but it is not at the center of curvature. Therefore, this system is not completely aberration free. It will be noted that the aberration can be reduced by making the curvature of mirror 224 somewhat longer than half that of mirror 222 and mirror 226, thus introducing some third order field curvature, which offsets the higher order aberrations. Thus, in one embodiment, the radius of curvature of mirror 222 and mirror 226 is 1134 mm and the radius of mirror 224 is 605 mm. This design minimizes aberrations, permitting the recompression of the initial 10 fs pulse to 15 fs.

In the stretcher illustrated in FIG. 2, large cylindrical mirrors 222 and 226 are utilized in order to provide the pass bandwidth without clipping of nearly 200 nm. The aperture in the long axis of mirror 222 and mirror 226 is 170 mm. Preferably, utilizing cylindrical mirrors provides a system with a reflected wavefront having an error of no more than $\lambda/10$. FIG. 5 is a temporal plot of the laser pulse after passing through the stretcher. As illustrated in FIG. 5, the temporal duration of the stretched pulse is 0.85 ns (FWHM).

After diffracting off of the second grating 228, the dispersed spectrum is recollimated. In the embodiment illustrated in FIG. 2, the dispersion compensator 126 is integrated into the pulse stretcher in the region where the light is collimated, which is the region between the second grating 228 and the roof mirror 230. Referring to the system schematic in FIG. 1, the stretcher 120 utilizes a different geometry than the modified Offner stretcher illustrated in FIG. 2. However, like the modified Offner stretcher illustrated in FIG. 2, the stretcher 120 includes a region where the light is collimated, between second grating 122b and retroreflector 124. Thus, as illustrated in FIG. 1, the stretcher 120 also provides a region where the dispersion compensator 126 may be located.

In one implementation in which a dispersion compensator integrated into the pulse stretcher as illustrated in FIG. 2, the dispersion compensator is made using a 5 mm thick plate of BK7 glass. Other suitable materials are included within the scope of the present invention, including fused silica, borofloat glass, sapphire, zinc selenide, and the like.

Although the stretcher illustrated in FIG. 2 is a modified Offner stretcher, embodiments of the present invention are not limited to this particular implementation and are suitable for use in other pulse stretcher geometries. In addition to integration in the stretcher, the dispersion compensator 126 could be integrated into the pulse compressor as illustrated by the alternative embodiment shown in FIG. 1, where the dispersion compensator 144 is inserted in the collimated region of the compressor 140 between grating 142a and mirror retroreflector 146.

As illustrated schematically in FIG. 1, after amplification, the spatial extent of the beam is expanded in comparison to the initial input beam, either as part of the amplification process, after amplification, or prior to or during pulse compression. Because of the high fluence associated with amplified beams, the beam expansion lowers the beam intensity, reducing the possibility of damage to optics as a result of high beam intensity. Thus, referring to FIG. 1, the spatial extent of the collimated beam in the compressor is greater than the spatial extent of the collimated beam in the stretcher.

In some embodiments, the dispersion compensator is integrated into the compressor, where the spatial extent of the collimated beam is typically larger than it is in the pulse stretcher. Because the MRF technique is characterized by a limit in the spatial frequency with which an optic an be polished, the larger beam area in the compressor can be well suited to phase profiles having higher spatial frequencies. In some embodiments, the spatial frequencies of the phase profiles are much lower the spatial frequency limit of the MRF techniques. In these embodiments, the lower beam power as the beam passes through the pulse stretcher may provide greater benefits than the lower spatial frequency as the beam passes through the pulse compressor.

Depending on the embodiment, the pulse stretcher may utilize a lens to replace one or more of the mirrors utilized in the pulse stretcher. Additionally, the set of diffraction gratings may be replaced by a single diffraction grating in alternative embodiments of the present invention. Moreover, although cylindrical mirrors are utilized in the pulse stretcher illustrated in FIG. 2, this is not required by the present invention and spherical, aspherical, or other suitable mirrors may be utilized. One of ordinary skill in the art would recognize many variations, modifications, and alternatives.

Referring once again to FIG. 1, the pulse stretcher includes a dispersion compensator and the pulse compressor includes an optional dispersion compensator. Typically the dispersion compensator is integrated into either the pulse stretcher or the pulse compressor, however, combinations thereof may also be utilized, with a portion of the phase compensation being provided by elements in both the pulse stretcher and the pulse compressor. One of ordinary skill in the art would recognize many variations, modifications, and alternatives.

Figure 3:
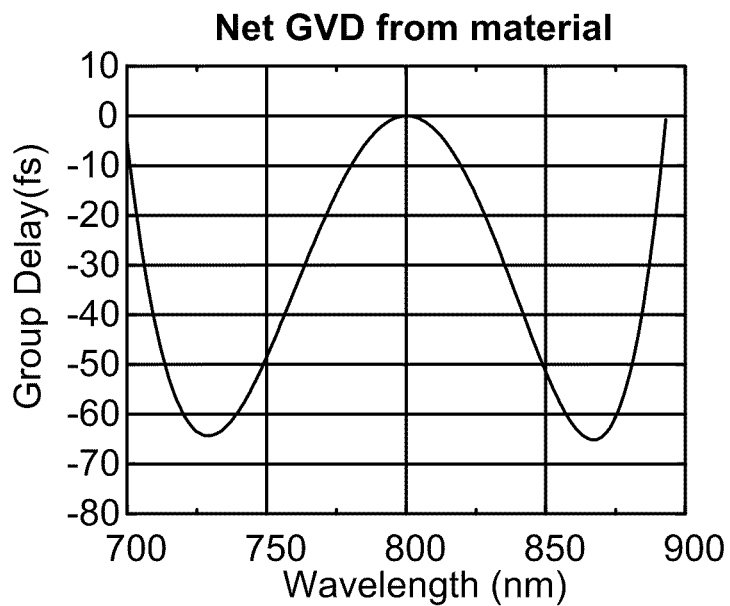
FIG. 3 is a simplified plot of residual group delay as a function of wavelength for a chirped pulse amplifier according to an embodiment of the present invention.

Embodiments of the present invention utilize a unique combination of techniques and components to compensate for the wavelength dispersion present in the CPA system. The compressor gratings, manufactured at Lawrence Livermore National Laboratory, have a higher groove density (1480 lines/mm) than the stretcher gratings. FIG. 3 is a simplified plot of residual group delay (i.e., dispersion) as a function of wavelength for a chirped pulse amplifier according to an embodiment of the present invention.

In typical implementations, the residual group delay, also referred to as an initial phase profile, is measured using an autocorrelation device such as a Grenouille device available from Swamp Optics, LLC of Atlanta, Ga. The Grenouille is a powerful ultra-short laser pulse measurement device that measures the pulse intensity and phase as a function of time.

As shown in FIG. 3, the residual group delay (also referred to as residual group velocity delay (GVD)) is illustrated for the CPA system including the pulse stretcher, pulse compressor, and 1300 mm of fused silica. The group delay across the 200 nm bandwidth illustrated in FIG. 3 is about 65 fs. Thus, based on the illustrated group delay, a 10 fs input pulse, under ideal circumstances, would only be recompressed to ~75 fs. However, as illustrated in FIG. 2, placing a precisely manufactured dispersion compensator in the pulse stretcher in front of the roof mirror, the residual group delay be can reduced markedly to enable pulse compression near the time-bandwidth limit. As described more fully throughout the present specification, the dispersion compensator in one embodiment is a piece or slab of fused silica with a predetermined surface profile formed using an MRF process. By designing the surface profile of the dispersion compensator as described herein, the residual group delay can be decreased significantly.

Figure 4:
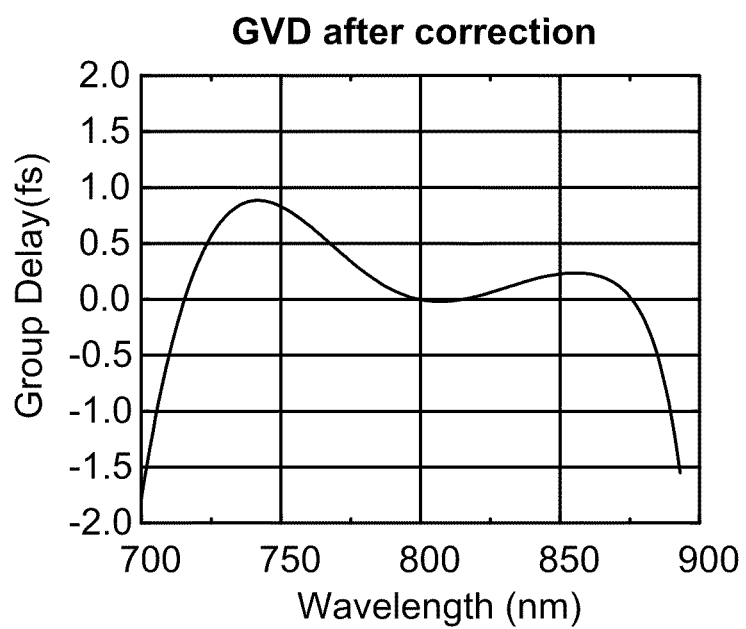
FIG. 4 is a simplified plot of residual group delay as a function of wavelength for a dispersion compensated chirped pulse amplifier according to an embodiment of the present invention.

FIG. 4 is a simplified plot of residual group delay as a function of wavelength for a dispersion compensated chirped pulse amplifier according to an embodiment of the present invention. It should be noted that the scaling of the ordinate (i.e., y-axis) in FIG. 3 is 90 fs, whereas in FIG. 4 it is only 4 fs. As illustrated in FIG. 4, the residual group delay has been decreased by about a factor of 20, from a maximum deviation of over 60 fs, to less than 3 fs. The spatial frequency of the group delay illustrated in FIG. 3 is a relatively slow function, with only a single peak separated by two valleys. For these low frequency phase profiles, the surface figure formed on the dispersion compensator is also characterized by a low frequency. As will be evident to one of skill in the art, as the spatial frequency of the group delay increases, aberrations can be introduced as the gradient of the slopes on the phase plate increase accordingly.

Figure 6:
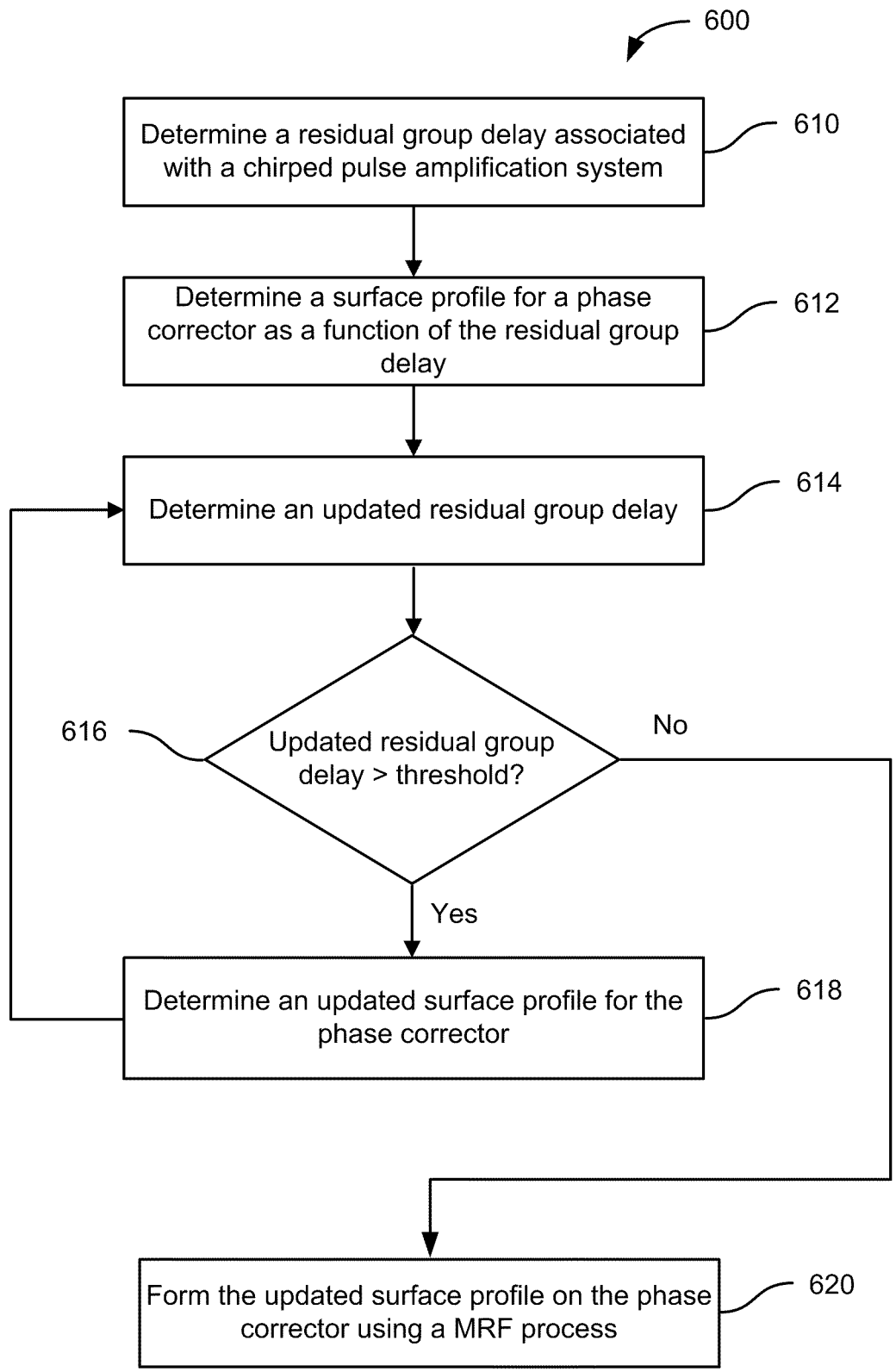
FIG. 6 is a simplified flowchart illustrating a method of fabricating a dispersion compensator according to an embodiment of the present invention.

FIG. 6 is a simplified flowchart illustrating a method of fabricating a dispersion compensator according to an embodiment of the present invention. In summary, the design and fabrication of the dispersion compensator (also referred to as a dispersion corrector plate (DCP)) begins with either a theoretical calculation of residual group delay (i.e., phase) or a phase measurement. Methods to measure the residual group delay include the use of a Grenouille as discussed above. Based on the computed or measured phase profile, the dispersion compensator ideally introduces the negative of the system phase, resulting in an overall phase of zero (i.e., flat as a function of wavelength). After determining the desired phase profile for the dispersion compensator, the phase profile is converted to a surface profile on the optic in the case of a transmissive dispersion compensator.

Referring to the method 600 illustrated in FIG. 6, a residual group delay associated with a CPA is determined (610). In this initial phase determination, the CPA system includes the pulse stretcher, the amplification stage, the pulse compressor, and a dummy phase plate. The dummy phase plate provides an approximation to the final dispersion compensator that is fabricated. In other embodiments, the dummy phase plate is not utilized. However, this will typically result in additional iterations during the process of determining the surface profile that is to be formed on the dispersion compensator.

A surface profile for the phase compensator is determined as a function of the residual group delay (612). Referring to FIG. 3, light at wavelengths around 730 nm and 870 nm is delayed significantly with respect to light at wavelengths around 800 nm. Thus, in this example, the dispersion compensator is designed with a surface profile such that light at ~800 nm has an optical path length greater than light at wavelengths around 730 nm and 870 nm. An updated residual group delay associated with the CPA system will be determined. In determining the updated residual group delay, the dummy phase plate is replaced with a first iteration of the phase compensator. Thus, the residual group delay should be less at (614) than it was at (610). In an embodiment, the residual group delay is measured at the output of the compressor.

A determination is made of whether the updated residual group delay is greater than a predetermined threshold (616). If the updated residual group delay is greater than the predetermined threshold, then an updated surface profile is determined for the phase compensator as a function of the updated residual group delay (618). The predetermined threshold can be related to the largest acceptable pulse width produced by the CPA system. As the residual group delay decreases, the pulse width decreases as well until an acceptable output is achieved. After the updated surface profile has been determined, (614) and (616) are repeated, preferably decreasing the updated residual group delay with each iteration. When the updated residual group delay is less than or equal to the predetermined threshold, the updated surface profile is formed on the phase compensator using an MRF process (620). Thus, an iterative process is used to design the phase compensator in the illustrated embodiment. It will be appreciated that rather than testing for an updated residual group delay greater than a predetermined threshold, the test could be for an updated residual group delay greater than or equal to, less than, or less than or equal to the predetermined threshold. The iterative process will be modified accordingly. One of ordinary skill in the art would recognize many variations, modifications, and alternatives.

During MRF processing, the polishing slurry of the MRF machine forms a small spot or "work function" which is a function of the material used in fabricating the dispersion compensator, the width of the slurry stream, and the time in contact with the workpiece. Additional description related to MRF processing is provided in co-pending and commonly assigned U.S. patent application Ser. No. 12/760,418, filed on Apr. 14, 2010, the disclosure of which is hereby incorporated by reference in its entirety for all purposes.

In order to form the desired surface profile on the dispersion compensator, the work function of the MRF process is convolved with the updated residual group delay to provide a map of slurry contact time versus position on the workpiece. By applying the slurry to the dispersion compensator in accordance with the mapping, deterministic polishing of the dispersion compensator is accomplished to produce a predetermined surface profile. Additional description of the MRF process is provided in the patent application incorporated by reference above.

Typically, the required surface structure of the dispersion compensator will be one dimensional (i.e., cylindrical surfaces), which are suitable for fabrication using the MRF method. In other words, the dispersion compensator is characterized by a constant phase profile along one dimension. In some embodiments designed by the inventors, the phase profile of the dispersion compensator is characterized by a few peaks across the dimension of the dispersion compensator aligned with the spatially dispersed laser light. Thus, for a dispersion compensator 10 cm wide, the spatial resolution provided by the MRF technique, which is less than 1 mm, is suitable for dispersion compensator fabrication. In these one dimensional implementations, the dispersion compensator can be integrated into either the pulse stretcher or the pulse compressor by placing the dispersion compensator in the collimated portion of the pulse stretcher/compressor where the colors present in the pulse are dispersed. The dispersion compensator is aligned to the dispersed spectrum so that the corrective phase is matched to the proper "color" of the spectrum.

Additionally, although dispersion compensators have been discussed in relation to cylindrical, transparent optics, spherical optics and reflective optics could also be utilized to provide the benefits described herein.

In an embodiment, a dummy phase plate is utilized in making the initial phase measurements. Of course, the dummy phase plate adds dispersion to the system. In alternative embodiments, computations are performed in conjunction with the phase measurement to mathematically insert the dummy phase plate in the system. Based on the phase measurements, the dispersion corrector is polished using MRF to form the predetermined surface profile. In some embodiments, since the depth of the material removed in forming the dispersion corrector is on the order of microns of material, the dummy phase plate can be used as the base plate for machining of the dispersion compensator. As the shape of the dispersion compensator is changed, the resulting phase profile will change in response and iteration is used as the system is disturbed as the dispersion compensator is slightly modified, then compensation for the modification is provided, and so forth. The iterations discussed above can be performed in code prior to machining of the dispersion compensator rather than in physical elements.

It should be appreciated that the specific steps illustrated in FIG. 6 provide a particular method of fabricating a dispersion compensator according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
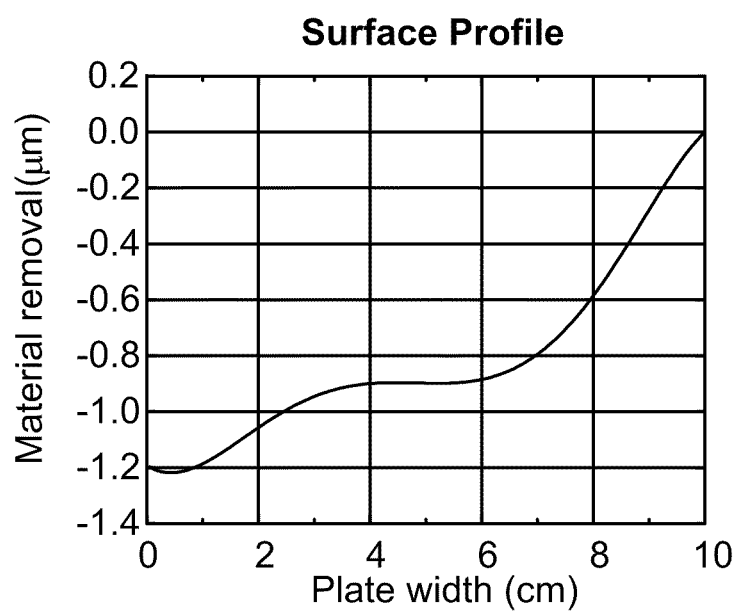
FIG. 7 is a simplified illustration of a phase profile associated with a dispersion compensator according to an embodiment of the present invention.

FIG. 7 is a simplified illustration of a phase profile associated with a dispersion compensator according to an embodiment of the present invention. As illustrated in FIG. 7, the amount of material removed from the dispersion compensator is about one micron at one edge of the plate. The amount of material removed as a function of position varies as a function of the plate width as illustrated in the figure.

Although the phase profile illustrated in FIG. 7 is a function with a positive slope across the width of the dispersion compensator, this is not required by the present invention. Multiple peaks could be present in the phase profile. Typically, the maximum deviation in the surface profile (peak-to-valley depth) will be about 1 µm. In other implementations, the maximum deviation in profile ranges from about 0.1 µm to about 3 µm. The number of peaks will depend on the particular phase profile that is compensated for, with between 0 and 3 peaks utilized in typical embodiments. The spacing between adjacent peaks, which can be less than 1 mm using the MRF techniques described herein, ranges from about 30 mm to about 100 mm, for example 50 mm. Of course, embodiments of the present invention are not limited to these particular values but include other ranges as appropriate to the particular application.

In alternative embodiments of the present invention, a "tunable" dispersion compensator is provided. The tunable dispersion compensator is manufactured by adjusting the surface profile (i.e., the magnitude of the surface features) as a function of position along the "cylindrical" axis of the dispersion compensator already discussed. Thus, by translating the tunable dispersion compensator in a direction normal to the dispersed spectrum, different phase profiles can be seen by the laser pulse. In another alternative embodiment, a reflective dispersion compensator is manufactured directly on one of the surfaces of the retro-reflector, with the surface profile adjusted such that the reflected phase is zero. One of ordinary skill in the art would recognize many variations, modifications, and alternatives.

It will be appreciated that the benefits provided by the MRF technique will enable fabrication of a dispersion compensator that includes the low frequency surface profile illustrated in FIG. 7 as well as higher order variations in the surface profile to account for spatio-spectral-temporal effects that will provide additional phase compensation at various wavelengths. Typically, a phase measurement will be made (e.g., similar to the plot illustrated in FIG. 3), a dispersion compensator will be fabricated to compensate for the phase variations, and the resulting phase profile will initially be non-zero. Using computations of the residual group velocity, the surface profile of the dispersion compensator can be changed using MRF, and thereby iteratively produce a dispersion compensator that reduces the resulting phase profile to acceptable levels. A benefit of using the MRF technique is that the dispersion compensator can be processed multiple times, forming different surface profiles at each iteration. If there are multiple compensators utilized in an experiment, which are known, a static version of a deformable optic can be fabricated by changing the surface profile in the direction orthogonal to the compensation profile. After fabrication, the user can translate the compensator in the same direction to adjust the compensation applied to the beam.

Embodiments of the present invention are applicable to many chirped pulse amplification systems, including low energy systems, high energy systems, low power systems, and high power systems, where pulse length control is desired. Chirped pulse amplification laser systems are currently used for selecting specific chemical reaction pathways or precision machining of high value components. As an example, commercial uses for femtosecond laser sources include materials processing (micromachining), replacement of synchrotron sources, which achieve maximum efficiency when an optimum pulse length is provided.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A chirped pulse amplification system comprising:
 a laser source providing an input laser pulse along an optical path, the input laser pulse being characterized by a first temporal duration;
 a multi-pass pulse stretcher disposed along the optical path, wherein the multi-pass pulse stretcher comprises:
  a first set of mirrors operable to receive input light in a first plane and output light in a second plane parallel to the first plane;
  a first diffraction grating operable to receive light from one or more of the first set of mirrors;
  a second set of mirrors operable to receive light diffracted from the first diffraction grating;
  a second diffraction grating operable to receive light from the second set of mirrors; and
  a reflective element operable to reflect light diffracted from the second diffraction grating;
 an amplifier disposed along the optical path;
 a pulse compressor disposed along the optical path; and
 a passive dispersion compensator disposed along the optical path.

2. The chirped pulse amplification system of claim 1 wherein the passive dispersion compensator is disposed between the second diffraction grating and the reflective element.

3. The chirped pulse amplification system of claim 1 wherein the dispersion compensator comprises a glass element having a predetermined phase profile characterized by a plurality of peaks and valleys.

4. The chirped pulse amplification system of claim 3 wherein the predetermined phase profile is associated with a predetermined surface profile of the glass element.

5. The chirped pulse amplification system of claim 4 wherein a peak-to-peak separation between portions of the predetermined surface profile is less than 3 mm.

6. The chirped pulse amplification system of claim 5 wherein the peak-to-peak separation is less than 1 mm.

7. The chirped pulse amplification system of claim 4 wherein an amplitude of the predetermined surface profile is between about 0.1 µm and 10 µm.

8. The chirped pulse amplification system of claim 7 wherein the amplitude of the predetermined surface profile is between about 0.5 and 2.0 µm.

9. The chirped pulse amplification system of claim 1 wherein the second set of mirrors comprise two cylindrical concave mirrors and a cylindrical convex mirror.

10. The chirped pulse amplification system of claim 1 wherein the reflective element comprises a roof mirror.

11. The chirped pulse amplification system of claim 1 wherein the pulse compressor comprises a second passive dispersion compensator.

* * * * *